UNITED STATES PATENT OFFICE.

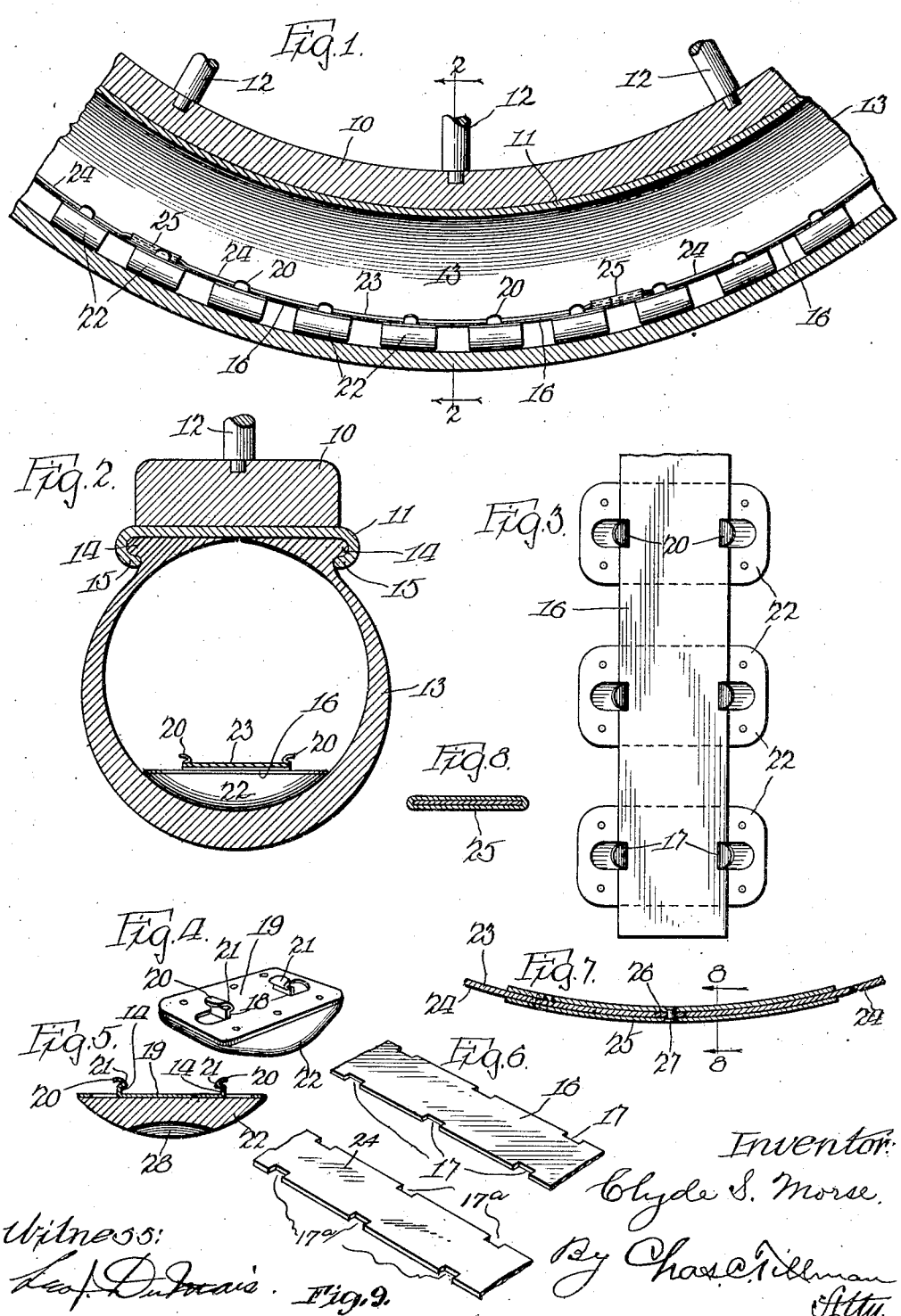

CLYDE S. MORSE, OF DE KALB, ILLINOIS, ASSIGNOR OF ONE-HALF TO STELLA S. MORSE, OF DE KALB, ILLINOIS.

RESILIENT TIRE.

1,322,259.  Specification of Letters Patent.  Patented Nov. 18, 1919.

Application filed February 8, 1919. Serial No. 275,683.

*To all whom it may concern:*

Be it known that I, CLYDE S. MORSE, a citizen of the United States, residing at De Kalb, in the county of Dekalb and State of Illinois, have invented certain new and useful Improvements in Resilient Tires, of which the following is a specification.

This invention relates to improvements in vehicle tires, and more particularly to the tires of automobiles, and it consists in certain peculiarities of the construction, novel arrangements, combination and operation of the various parts thereof, as will be hereinafter more fully set forth and specifically claimed.

The principal object of the invention is to provide a simple, efficient, durable and practical means to be used as a substitute or in lieu of an ordinary pneumatic tube tire, whereby an outer flexible casing of the usual or ordinary type for pneumatic tires may be resiliently and mechanically supported or maintained in a distended condition, to the end, that damage to the tire by reason of puncture will be reduced to the minimum, or practically eliminated. Another object of the invention is to so construct the filler or inner mechanism for the casing that it can be readily adapted to casings or tires of different sizes. A still further and important object of the invention is to provide a resilient tire of such construction and arrangements of its parts that if desired the casing of an ordinary pneumatic tire, whether new or used, or of high or low grade material, may be employed as one of the elements of the invention. Numerous other objects and advantages of the invention will be disclosed in the subjoined description and explanation.

In the accompanying drawing which serves to illustrate an embodiment of the invention—

Figure 1 is a sectional view taken circumferentially through a portion of the felly, rim and tire of a wheel illustrating the resilient tread members supported on the inner surface of the tread portion of the casing and in position for use;

Fig. 2 is a greatly enlarged cross sectional view taken on line 2—2 of Fig. 1, looking in the direction indicated by the arrows;

Fig. 3 is a plan view of a portion of one of the outer supporting strips for the tread members or blocks, showing a means for securing said members or blocks to said strip.

Fig. 4 is a detached perspective view of one of the tread members or blocks;

Fig. 5 is a cross sectional view thereof illustrating a modification therein;

Fig. 6 is a detached perspective view of a portion of one of the outer supporting strips for said members or blocks;

Fig. 7 is a sectional view taken circumferentially through portions of the resilient or expansible inner band or keeper for the tread members and outer strips, showing the means of connecting sections of said band together.

Fig. 8 is a cross sectional view taken on line 8—8 of Fig. 7, looking in the direction indicated by the arrows.

Fig. 9 is a detached perspective view of a portion of the inner band or keeper.

Like numerals of reference refer to corresponding parts throughout the different views of the drawing: The felly of the wheel is designated by the reference numeral 10, the rim by the numeral 11, and the spokes by the numeral 12, all of which may be of the ordinary construction and arrangement. The casing of the tire, which may be of the preferred or ordinary kind, such as that employed in pneumatic tires in common use, is indicated by the numeral 13, and may be of any suitable flexible material. As shown in Fig. 2 the casing 13 is split circumferentially on its inner periphery so that when in position on the felly and rim the edges of the casing will be approximated, thus forming substantially a cylindrical tube. Near each of its edges the casing is provided with a laterally extended bead or enlargement 14, which engage inturned flanges 15 on the edges of the rim. Located concentrically with the inner surface of the tread portion of the casing are a number of resilient metallic strips 16, which may be of any suitable lengths, and when operatively located have their adjacent ends closely approximated or abutting. Each of the strips 16, which will be designated as the outer strips, or tread member carrying strips, is provided with notches 17 in its sides, which notches are arranged in pairs, as is clearly shown in Fig. 6 of the drawing. These notches are for the reception and engagement of spring catches 18, formed on plates 19 by being punched or up-set therefrom, as will be readily understood by reference to Figs. 4 and 5 of the drawing. Each of the plates 19 is provided with a pair of said spring catches, each of which has its free portion turned outwardly as at 20, thus providing each catch with an inwardly extended portion 21 to overlie the strips 16 and the inner band or keeper for said strips and tread members, as will be presently explained. Each of the plates has secured thereto by means of rivets or otherwise an arched or segmental block or member 22 of any suitable material, but by preference of rubber or a composition having considerable resiliency. The plates 19 carrying the blocks 22 are placed on the outer surfaces of the strips 16 so that the spring catches 18 on each plate will engage a pair of the notches 17 of the strips 16, when, it is obvious that the tread members 22 will be held in spaced relation on the strips 16 and transversely thereof. When thus arranged the strips 16 carrying the tread members 22 are placed in the casing 13, so that said members will rest transversely on the inner surface of the tread portion of the casing, as is clearly shown in Figs. 1 and 2 of the drawing. A sufficient number of the strips 16 are employed to extend entirely around the inner surface of the tread portion of the casing. When thus assembled there will be a slight space between each of the inwardly extended parts 21 of the spring catches and the inner surface of the strips 16, which is for the purpose of receiving the resilient band or keeper, which is designated as a whole by the reference numeral 23, but which is by preference made up of a number of sections 24, which are connected together by means of metallic sleeves or couplings 25, which are substantially flat, as shown in Figs. 7 and 8, but of sufficient width to permit of the insertion and retention of the adjacent ends of the sections 24 constituting the resilient band or keeper. Each of the couplings 25 or sleeves has located transversely therein at about its middle a stop bar 26, against which the ends of the sections 24 may abut. The bar 26 of each of the sleeves or couplings 25 is held in position by means of rivets 27 or otherwise. The side edges of each of the sections 24 of the expansible band or keeper 23 are by preference provided with notches 17$^a$ to register with the notches 17 of the outer strips 16, and to receive the spring catches 18, there being sufficient space between the inturned portions 21 of said catches and the inner surfaces of the outer strips 16 to receive the sections 24 of the keeper or expansible band 23. The sections of the band or keeper 23 are by preference made of various lengths in order that said bands may be built up to sizes adapted for the variation in the sizes or diameter of the tire casing.

While I prefer to make the band 23 or keeper of sections as above described, yet it is apparent that a continuous resilient band may be employed, in which case the sleeves or couplings 25 will be omitted. Whether the outer or inner band is made of a continuous piece or of sections it is only necessary to place their lower portions when they are assembled with respect to one another in the lower portion of the casing when by flexing or bending inwardly the upper portions of said bands they may be alined with the inner side portions of the casing and permitted to expand into the same.

After the tread member carrying strips 16 shall have been placed within the casing 13 and positioned so that the tread members 22 will rest against the inner surface of the tread portion of the casing, the keeper or expansible band 23 by proper manipulation can be placed between the upturned portions 20 of the spring catches 18 with its recesses or notches 17$^a$ registering therewith, then by permitting the band or keeper 23 to expand, it is obvious that the spring catches will yield sufficiently at their outturned portions 20, to allow the keeper or band 23 to pass the inward extensions 21 of said catches and to rest on the surfaces of the outer strips 16, in which position said band will be securely held by the clamping action of the spring catches. By this arrangement, it is evident that the band 23, whether made up of sections or of a continuous piece, will possess great resiliency and considerable tension, and will act as a keeper for the outer strips 16 and the tread members 22, which they carry, will maintain them in position against the inner surface of the tread portion of the casing.

In Fig. 5 is illustrated a modification in the construction of the tread members 22, which consists in providing each of said members with a concave cavity 28 on its outer portion, which will increase the resiliency of said blocks and also act to prevent the same slipping on the casing.

By employing a tire embodying my improvements, it will be readily understood and clearly seen that great efficiency, durability, resiliency and economy will be afforded, and that if the tire casing is punctured or badly cut a resilient tire will still be furnished by reason of the resilient blocks and their resilient supports.

Having thus fully described my invention what I claim as new and desire to secure by Letters Patent is—

1. In a resilient tire, the combination with a circular casing, of a plurality of strips located circumferentially within the casing, a plurality of arched tread members mounted in spaced relation on each of said strips and interposed between the same and the tread of the casing, a resilient keeper band located on the inner surfaces of said strips, and co-acting means on the tread members, said keeper band and said strips to prevent undue movement of the tread members on said band and strips.

2. In a resilient tire, the combination with a circular casing, of a plurality of strips located circumferentially within the casing, a plurality of arched tread members mounted in spaced relation on each of said strips and interposed between the same and the tread of the casing, a resilient keeper band located on the inner surfaces of said strips and consisting of a plurality of circumferentially disposed sections, couplings uniting the adjacent ends of said sections, and co-acting means on the tread members, said keeper band and said strips to prevent undue movement of the tread members on said band and strips.

3. In a resilient tire, the combination with a circular casing, of a plurality of strips located circumferentially within the casing at a distance from the inner surface of the tread thereof, a plurality of arched tread members mounted on the outer surface of each of said strips and spaced apart thereon, a pair of spring catches on each of said members extended inwardly therefrom at the sides of said strips, and a resilient keeper band located on the inner surface of said strips and between the members of each pair of said spring catches.

4. In a resilient tire, the combination with a circular casing, of a plurality of strips located circumferentially within the casing at a distance from the inner surface of the tread thereof and having notched edges, a plurality of arched tread members mounted on the outer surface of each of said strips and spaced apart thereon, a pair of spring catches on each of said members extended inwardly therefrom at the sides of said strips, each of said spring catches having its free end out-turned and provided with an inwardly extended portion between its ends, a resilient keeper band located on the inner surface of said strips and between the members of each pair of said spring catches and consisting of a plurality of circumferentially disposed sections, and couplings uniting the adjacent ends of said sections.

In witness whereof I have hereunto subscribed my name at De Kalb, Dekalb county, Illinois, this 15th day of January, 1919, in the presence of two subscribing witnesses.

CLYDE S. MORSE.

Witnesses:
AVIS I. MORSE,
S. A. TYLER.